United States Patent [19]

Schechtman

[11] Patent Number: 4,473,949
[45] Date of Patent: Oct. 2, 1984

[54] NUMERICAL DISPLAY BELT

[76] Inventor: Jay C. Schechtman, 1832 Cour de Iberville #1, Germantown, Tenn. 38138

[21] Appl. No.: 414,304

[22] Filed: Sep. 2, 1982

[51] Int. Cl.³ .............................................. G01B 7/00
[52] U.S. Cl. .................................. 33/141 E; 33/176; 33/178 E; 33/179
[58] Field of Search ................ 33/134 R, 137 R, 129, 33/141 E, 179, 178 E, 176; 2/312, 311; 272/125; 24/31 R, 35

[56] References Cited

U.S. PATENT DOCUMENTS

| | | | |
|---|---|---|---|
| 650,389 | 5/1900 | Hatfield | 33/137 R X |
| 2,271,725 | 2/1942 | Tunnicliff | 33/179 |
| 2,761,986 | 9/1956 | Wald et al. | 33/134 R X |
| 3,685,155 | 8/1972 | Oblander | 33/137 R |
| 4,383,301 | 5/1983 | Morita et al. | 33/141 E |

FOREIGN PATENT DOCUMENTS 567278  5/1958  Belgium ........................ 33/137 R

OTHER PUBLICATIONS

Belt With Built-In Tape Measure, Washington Post, Feb. 14, 1962, p. A 3.

Primary Examiner—William D. Martin, Jr.
Attorney, Agent, or Firm—Walker & McKenzie

[57] ABSTRACT

A numerical display device for displaying the size of a person's waist. A belt having a definite length is provided for being positioned about a person's waist. The belt has a buckle attached to one end thereof. The buckle is adapted to secure the belt about the person's waist. A transducer is coupled to the buckle for sensing the length of the belt required to extend around the person's waist and for displaying a numerical figure to indicate the exact length of the belt required to extend around the person's waist, thus indicating the size of the person's waist.

5 Claims, 3 Drawing Figures

NUMERICAL DISPLAY BELT

BACKGROUND OF THE INVENTION

1. Field of the Invention

The present invention relates to a belt for encircling a person's waist having a buckle that displays a number corresponding to the size of the person's waist.

2. Description of the Prior Art

Various devices have heretofore been developed that relate to numerical display instruments and the like. See, for example, Snider, U.S. Pat. No. 1,238,841; Tunnicliff, U.S. Pat. No. 2,271,725; McCann, U.S. Pat. No. 2,428,980; Tell, U.S. Pat. No. 2,529,058; Unger, U.S. Pat. No. 2,636,281; Williams, U.S. Pat. No. 2,860,215; Mason, U.S. Pat. No. 3,918,166; Johnson, U.S. Pat. No. 4,143,267; Jacobson, U.S. Pat. No. 4,211,011; Grant, U.S. Pat. No. 4,242,574; and Long, U.S. Pat. No. 4,286,386. None of the above patents disclose or suggest the present invention.

SUMMARY OF THE INVENTION

The present invention provides a novelty-type belt means having a buckle that displays the size of the person's body about which the belt is attached. The present invention includes in general, an elongated belt having first and second ends and a midportion; a buckle means attached to the second end of the belt and having securement means for securing the midportion of the belt relative to the second end thereof; and a transducer means for sensing the length of the belt required to extend about a body and for displaying a numerical figure to indicate the belt length on the buckle means.

DESCRIPTION OF THE PREFERRED EMBODIMENT

Figure 1:
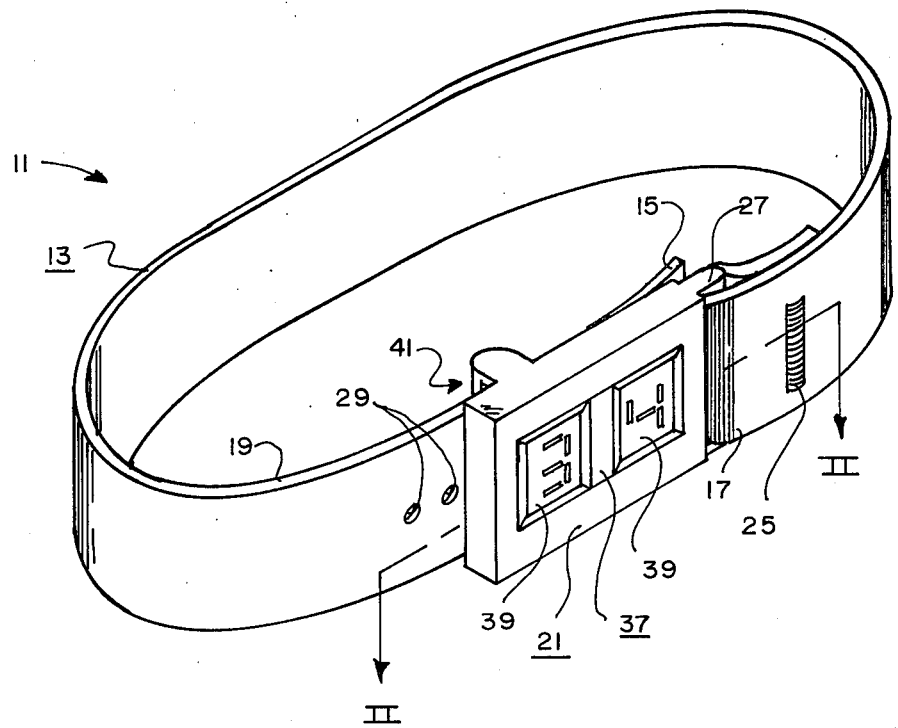
FIG. 1 is a perspective view of the numerical display belt of the present invention.

The numerical display belt means 11 of the present invention includes an elongated belt 13 for being secured about a body such as a person's waist. The belt 13 has a first end 15, a second end 17 and a midportion 19 (see, in general, FIG. 1). The belt 13 preferably has a definite length and is preferably constructed of a substantially nonstretchable material such as leather or the like in any manner apparent to those skilled in the art.

Figure 2:
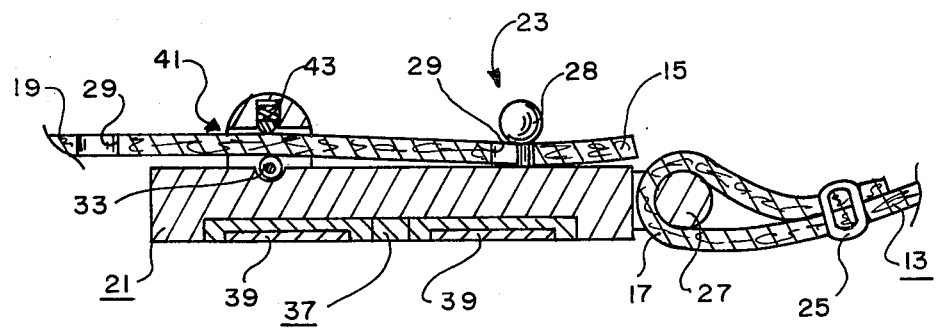
FIG. 2 is an enlarged sectional view substantially as taken on line 2 of FIG. 1.

The belt means 11 of the present invention also includes a buckle means 21 for being attached to the second end 17 of the belt 13. The buckle means 21 includes securement means 23 for securing the midportion 19 of the belt 13 relative to the second end 17 thereof about the body. The buckle means 21 may be attached to the second end 17 of the belt 13 in any manner apparent to those skilled in the art such as by way of the typical stitch 25 and bar 27 combination (see, FIGS. 1 and 2). The securement means 23 may also be of any type well-known to those skilled in the art. For example, the securement means 23 may consist merely of a peg-like member 28 for extending into one of a plurality of spaced apart apertures 29 in the first end 15 of the belt 13 (see, in general, FIG. 2).

Figure 3:
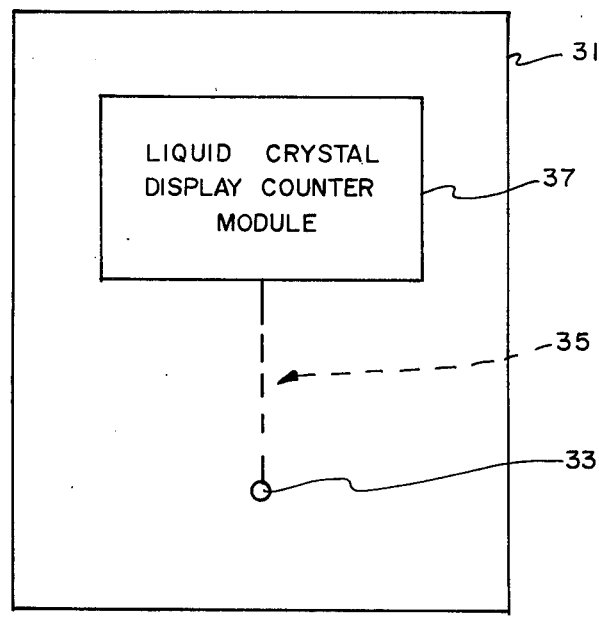
FIG. 3 is a somewhat schematic view of the transducer means of the belt of the present invention.

The belt means 11 also includes a transducer means 31 (see, in general, FIG. 3) for sensing the length of the belt 13 required to extend about the body and for displaying a numerical figure to indicate that length. The transducer means 31 preferably includes a digital display means mounted on the buckle means 21 for displaying a specific number, and preferably includes a sensor means for sensing the length of the belt 13 extending about the body. The sensor means preferably includes a roller member 33 mounted on the buckle means 21 in a position to rotatably contact the belt 13 as the belt 13 is secured about the body. The roller member 33 may be substantially smooth to be rotated principally by friction contact with the belt 13 or may have a number of cogs or teeth thereon (not shown) to make positive contact with a plurality of indents or apertures (not shown) in the belt 13. The sensor means may also preferably include control linkage means 35 as shown diagramatically in FIG. 3 extending between the roller member 33 and the display means to cause the display means to display a number based on the amount of the belt 13 that has been moved past the roller member 33. The display means preferably includes typical on-off switch means (not shown) and a typical source of electrical energy such as a battery and/or an array of photovoltaic cells (not shown). The display means preferably consists of a typical, well-known liquid crystal display counter module 37 (see FIG. 3). A typical, well-known light emitting diode counter module or the like could also be used. Such counter modules are now often used in the UHF tuners in television sets and the like in which case the roller member 33 and control linkage means 35 would replace the typical channel selection knob and linkage means. Since such counter modules are well-known to those skilled in the art, a complete description of the construction and operation thereof should not now be needed for the purpose of the present invention. It should be noted, however, that the counter module 37 preferably includes at least two typical 7-segment liquid crystal displays 39 to allow a two digit numeral to be displayed on the buckle means 21. It should be understood that the transducer means 31 can be of various other types and constructions which should now be apparent to those skilled in the art. Thus, for example, the transducer means 31 may utilize the principle of varying resistance of a length of wire. That is, since the resistance of a length of wire is directly related to its length, if an electrical current is passed through the wire, a voltage drop will occur along its length due to this resistance. Therefore, a probe will preceive different voltages at different points along the length of wire. By securing a length of wire along the length of the belt 13, and utilizing a probe on the buckle means 21 to complete a circuit through the wire, the transducer means 31 could be provided with a voltage meter to transmit a different voltage at different belt lengths to a circuit which would use these varying voltages to drive a liquid crystal display from one number to another. This variable resistance principle could also utilize a rheostat to which the roller member 33 is coupled.

The buckle means preferably includes a passageway means 41 through which the first end 15 and a portion of the midportion 19 of the belt 13 is passed when the belt 13 is positioned around the body. The roller member 33 is positioned adajacent the passageway means 41 for being rotated by the first end 15 and the portion of the midportion 19 of the belt 13 as the belt 13 is positioned around the body. The passageway means 41 may include a spring means 43 or the like for forcing the belt 13 against the roller member 33.

The operation of the belt means 11 of the present invention is quite simple. The belt 13 is merely positioned about a body, for example, a person's waist, in the typical manner and the first end 15 thereof inserted into and through the passageway means 41. As the first end 15 of the belt 13 is inserted through the passageway means 41, the spring 43 will cause the belt 13 to contact the roller member 33 and cause the roller member 33 to rotate. The rotation of the roller member 33 will inturn cause the counter module 37 to display a number based on the amount of the belt 13 that has been moved past the roller member 33. More specifically, since the belt 13 has a definite length, when the first end 15 thereof is first inserted into the passageway means 43, the numeral indicated by the counter module 37 will indicate the maximum length of the belt 13. Thus, for example, if the belt 13 has a maximum length of 40 inches, the numeral indicated by the counter module when the first end 15 of the belt 13 is first inserted into the passageway means 41 will be 40. As the first end 15 of the belt 13 is inserted through the passageway means 41, the roller member 33 will cause the number indicated by the counter module 37 to become smaller by an amount proportionate to the length of the belt 13 that has been moved past the roller member 33. Thus, for example, if six inches of the belt 13 is moved past the roller member 33 in the above example of the belt 13 having a maximum length of 40 inches, the counter module will display the number 36. The belt 13 is secured about the body by way of the securement means 23.

Although the invention has been described and illustrated with respect to a preferred embodiment thereof and a preferred use therefore, it is not to be so limited since changes and modifications can be made therein which are within the full intended scope of the invention.

I claim:
1. Numerical display belt means comprising:
   (a) an elongated belt for being secured about a body, said belt having a definite length, having a first end, having a second end, and having a midportion;
   (b) buckle means for being attached to said second end of said belt, said buckle means including securement means for securing said midportion of said belt relative to said second end; and
   (c) transducer means operatively coupled to said belt for sensing the length of said belt required to extend about the body and for displaying a numerical figure to indicate that length.

2. The numerical display belt means of claim 1 in which said transducer means includes a digital display means mounted on said buckle means for displaying a specific number, and includes a sensor means for sensing the length of said belt extending about the body.

3. The numerical display belt means of claim 2 in which said sensor means includes a roller member mounted on said buckle means in a position to rotatably contact said belt as said belt is positioned about the body, and includes control linkage mens extending between said roller member and said display means to cause said display means to display a number based on the amount of said belt that has been moved past said roller member.

4. The numerical display belt means of claim 3 in which said buckle means includes a passageway means through which said first end and a portion of said midportion of said belt is passed when said belt is passed around the body, said roller member being positioned adjacent said passageway member for being rotated by said first end and the position of said midportion of said belt as said belt is passed around the body.

5. The numerical display belt means of claim 4 in which said display means includes liquid crystal displays for displaying a numerical figure.

* * * * *